(12) United States Patent
Zola

(10) Patent No.: US 6,376,795 B1
(45) Date of Patent: Apr. 23, 2002

(54) DIRECT CURRENT DECHUCKING SYSTEM

(75) Inventor: Jeffrey S. Zola, Portland, OR (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/695,534

(22) Filed: Oct. 24, 2000

(51) Int. Cl.$^7$ ............................................... B23K 10/00
(52) U.S. Cl. ........................... 219/121.43; 219/121.58; 219/121.4; 361/234; 279/128; 156/345
(58) Field of Search ....................... 219/121.58, 121.41, 219/121.43, 121.44, 121.48, 121.54, 121.57; 269/21; 156/345; 204/298.21; 361/234, 233; 279/128

(56) References Cited

U.S. PATENT DOCUMENTS

| | | | | |
|---|---|---|---|---|
| 5,793,192 A | * | 8/1998 | Kubly et al. | 323/312 |
| 6,150,667 A | * | 11/2000 | Ishizaka et al. | 257/21 |
| 6,198,616 B1 | * | 3/2001 | Dahimene et al. | 361/234 |
| 6,246,567 B1 | * | 6/2001 | Parkhe | 361/234 |

* cited by examiner

Primary Examiner—Mark Paschall
(74) Attorney, Agent, or Firm—Luedeka, Neely & Graham (57) ABSTRACT

An electrostatic chuck, disposed within a processing chamber, receives a substrate and signals to selectively grip and release the substrate. A radio frequency power supply creates and passes a first signal to a first path that passes it to a high pass filter. The high pass filter inhibits signals lower than a first frequency from passing to the radio frequency power supply through the first path, and passes the first signal to a second path. The second path passes the first signal to a first electrode in the processing chamber, which emits the first signal within the processing chamber. A second electrode is also disposed within the processing chamber. The second electrode receives a second signal, and emits the second signal within the processing chamber. The emission of the first and second signals creates a plasma from the environment within the processing chamber. The processing of the substrate tends to create a residual charge in the substrate, and tends to inhibit the selective release of the substrate from the electrostatic chuck. A direct current power supply, connected to a ground, creates and passes an absolute signal to a third path. The third path passes the absolute signal to a low pass filter. The low pass filter passes the absolute signal to a fourth path, and inhibits signals higher than a second frequency from passing to the direct current power supply through the third path. The fourth path passes the absolute signal to the first electrode. The first electrode receives an absolute potential reference from the absolute signal. A controller selectively enables application of the first and second signals to the first and second electrodes, respectively. The controller also enables application of the grip and release signals to the electrostatic chuck. The controller further selectively energizes the direct current power supply to apply the absolute signal to the first electrode to reduce the residual charge in the substrate, enabling an easier release of the substrate from the electrostatic chuck.

20 Claims, 5 Drawing Sheets

DIRECT CURRENT DECHUCKING SYSTEM

TECHNICAL FIELD

This invention relates to the field of substrate retention systems. More particularly, this invention relates to electrostatic substrate chucking and dechucking in the course of semiconductor substrate processing.

BACKGROUND OF THE INVENTION

There are many processes in which the substrate on which semiconductor devices are formed is held in place by gravity alone. In such processes, the substrate is typically held in a horizontal face up position, which tends to be the only orientation available when gravity alone is used to hold the substrate. However, it is often desirable to retain the substrate in an alternate position during processing. In addition, there may be reasons for wanting to retain the substrate in a horizontal position. For example, the process may be one in which the substrate tends to be moved about, such as by the forces of moving fluids. Further, it may be desired to subject the substrate to a process condition that impinges upon the substrate from a very specific angle. Thus, retaining the substrate in a specific orientation during a process such as these improves the process by reducing variability, such as might be introduced by substrates that are in different positions from run to run.

Generally, two different forms of substrate retention are used. In one form, the substrate is mechanically held against a support means, such as a backing plate. Various means, such as clips, springs, or rings, are used to make contact with the front of the substrate and to press against the front of the substrate so as to retain the substrate against the support means. While retaining the substrate using front side contact is a very easily implemented method of retaining the substrate, it unfortunately tends to introduce certain undesirable conditions. There are a variety of reasons for this, most of which relate to the fact that the devices are predominantly formed on the front side of the substrate.

For example, contact with the front side of the substrate tends to increase the likelihood of damage to the devices, such as by physically scratching or otherwise crushing or damaging the devices contacted by the front side contact means. Further, contact on the front side of the substrate during certain steps tends to mask the substrate, in the region of the clips or springs that are used to retain the substrate, from the desired processing that is accomplished while the substrate is retained. For example, the clip that makes contact with the front side of the substrate to hold the substrate against a backing plate tends to partially mask the substrate during a deposition process. By masking the desired processing in various locations on the substrate, the devices to be formed in those locations do not receive the processing that is necessary to function properly. Thus, substrate yield is somewhat reduced and cost is commensurately increased.

For the reasons given above, retaining the substrate by means that contact only the back side of the substrate tend to be preferred in many applications. Unfortunately, there are other issues associated with the back side contact methods used to retain substrates. For example, retaining a substrate by drawing a vacuum against the back side of the substrate is only practical at certain processing pressures. Since a vacuum can only be drawn to a theoretical limit of a pressure of zero, processing which is performed under very low pressure conditions tends to reduce the total amount of force that retains the substrate in place. Thus, as the processing pressure is reduced, there is an increased tendency for substrates to work loose from the retaining means. This, of course, tends to reduce the effectiveness of the substrate retention means.

Another method of retaining substrates using back side contact is an electrostatic chuck. This method works by inducing regional electrostatic charges in the substrate with the electrostatic chuck, and then attracting these regional electrostatic charges with opposing complimentary charges in the electrostatic chuck. The attraction between the opposing complimentary charges in the electrostatic chuck and the induced regional electrostatic charges in the substrate tend to retain the substrate against the electrostatic chuck.

Unfortunately, the substrate may tend to accumulate a residual charge during processing, which residual charge is in addition to the induced regional electrostatic charges. Thus, when the electrostatic chuck is de-energized, the accumulated residual charge in the substrate tends to retain the substrate against the electrostatic chuck to some degree. This condition tends to prevent the substrate removal means from removing the substrate from the electrostatic chuck in a smooth manner, as the substrate may initially stick to and then spring from the electrostatic chuck as the substrate removal means lifts the substrate from the electrostatic chuck and overcomes the attraction between the residual charge in the substrate and the electrostatic chuck.

What is needed, therefore, is a system for reducing the residual charge in a substrate and improving the release of a substrate from an electrostatic chuck.

SUMMARY OF THE INVENTION

The above and other needs are met by an improvement to a plasma processing system. A processing chamber contains an environment and processes a substrate. An electrostatic chuck is disposed within the processing chamber, and receives the substrate. The electrostatic chuck also receives grip and release signals, which are operable to enable the electrostatic chuck to selectively grip the substrate and selectively release the substrate.

A radio frequency power supply creates and passes a first radio frequency potential signal to a first conduction path that is connected to the radio frequency power supply. The first conduction path passes the first radio frequency potential signal to a high pass filter that is connected to the first conduction path. The high pass filter inhibits signals lower than a first frequency from passing to the radio frequency power supply through the first conduction path, and passes the first radio frequency potential signal to a second conduction path that is connected to the high pass filter.

The second conduction path receives the first radio frequency potential signal from the high pass filter, and passes the first radio frequency potential signal to a first electrode that is disposed within the processing chamber, and which is connected to the second conduction path. The first electrode receives the first radio frequency potential signal from the second conduction path and emits the first radio frequency potential signal within the processing chamber.

A second electrode is also disposed within the processing chamber. The second electrode receives a second radio frequency potential signal, and emits the second radio frequency potential signal within the processing chamber. The emission of the first radio frequency potential signal and the emission of the second radio frequency potential signal create a plasma from the environment within the processing chamber, and thereby process the substrate. The processing of the substrate tends to create a residual charge in the substrate. The residual charge in the substrate tends to inhibit the selective release of the substrate from the electrostatic chuck.

A direct current power supply, connected to a ground, creates and passes an absolute direct current potential signal to a third conduction path that is connected to the direct current power supply. The third conduction path receives the absolute direct current potential signal and passes it from the direct current power supply to a low pass filter. The low pass filter is connected to the third conduction path, and passes the absolute direct current potential signal to a fourth conduction path that is also connected to the low pass filter. The low pass filter also inhibits signals higher than a second frequency from passing to the direct current power supply through the third conduction path.

The fourth conduction path receives the absolute direct current potential signal from the low pass filter, and passes the absolute direct current potential signal to the first electrode, to which it is connected. The first electrode receives the absolute direct current potential signal from the fourth conduction path, and thereby receives an absolute potential reference.

A controller selectively enables application of the first radio frequency potential signal to the first electrode and application of the second radio frequency potential signal to the second electrode. The controller also selectively enables application of the grip and release signals to the electrostatic chuck. The controller further selectively energizes the direct current power supply to apply the absolute direct current potential signal to the first electrode when reduction of the residual charge in the substrate is desired, and thereby assists in the desired release of the substrate from the electrostatic chuck.

Thus, by applying an absolute potential to the first electrode, the potential of the first electrode is no longer at a relative or floating potential, and a discharge plasma ignited through the first electrode is operable to reduce the charge that tends to accumulate in the substrate. Thus, the alleviation of the accumulated charge reduces the difficulty in dechucking the substrate from the electrostatic chuck. The high pass filter inhibits the absolute direct current potential signal from traveling back to the radio frequency power supply and damaging the radio frequency power supply, and the low pass filter inhibits the first radio frequency potential signal from traveling back to the direct current power supply and damaging the direct current power supply.

In various preferred embodiments of the plasma processing system, the first frequency is between about 100 kilohertz and about 1.4 gigahertz, and the second frequency is between about sixty hertz and about 1.4 gigahertz, and most preferably about sixty hertz. The absolute direct current potential signal preferably has a voltage of between about zero volts and about 500 volts, and most preferably between about zero volts and about 200 volts. Most preferably, the controller is operable to energize the direct current power supply at either a fixed or programmable voltage in an automated fashion upon occurrence of one or more events, or at a programmed point in the processing.

Another embodiment of the invention provides a method for reducing charges accumulated on a substrate, where the substrate resides on an electrostatic chuck in a processing chamber of a plasma processing system. The plasma processing system has a radio frequency power supply connected by a first conduction path to an electrode disposed within the processing chamber. The first conduction path is high pass filtered to inhibit signals lower than a first frequency from passing to the radio frequency power supply from the first electrode. An absolute direct current potential signal is applied to the first electrode through a second conduction path with a direct current power supply. The second conduction path is low pass filtered to inhibit signals higher than a first frequency from passing to the direct current power supply from the first electrode.

BRIEF DESCRIPTION OF THE DRAWINGS

Further advantages of the invention will become apparent by reference to the detailed description of preferred embodiments when considered in conjunction with the following drawing, which are not to scale so as to more clearly depict the details, wherein like reference numbers refer to like elements throughout the several views and wherein.

DETAILED DESCRIPTION OF THE INVENTION

Figure 1:
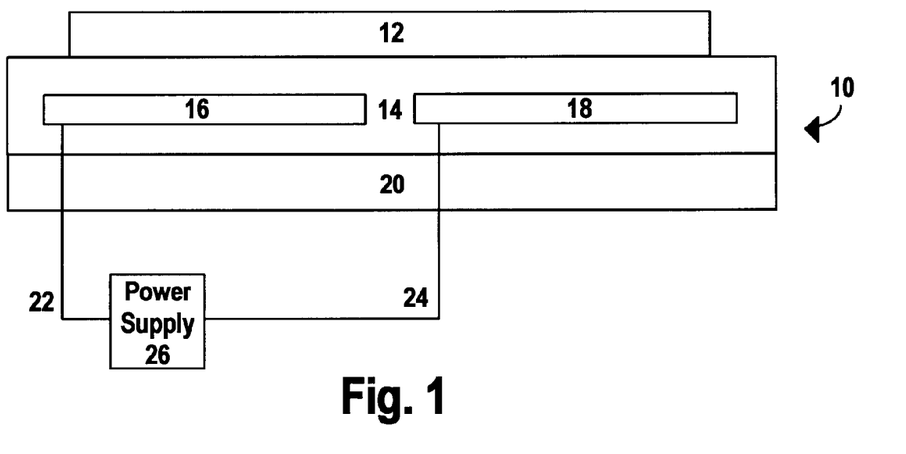
FIG. 1 is a cross sectional functional representation of an electrostatic chuck prior to energizing.

Referring now to FIG. 1, there is depicted a cross sectional functional representation of an electrostatic chuck 10, upon which resides a substrate 12. The electrostatic chuck 10 has a nonconductive portion 14 formed of a relatively electrically nonconductive material, such as a ceramic or a thermoplastic resin, and a portion 20 that may have a variety of functions, as described more completely below, including also being formed of a nonconductive material. Buried within the nonconductive portion 14 are a first conductor 16 and a second conductor 18. The first conductor 16 and the second conductor 18 are preferably formed of a relatively electrically conductive material, such as a metal or a metal alloy. The first conductor 16 is connected to one pole of a power supply 26 via conductive path 22, and the second conductor 18 is connected to the other pole of the power supply 26 via conductive path 24. The conductive path 22 and the conductive path 24 are preferably formed of a relatively electrically conductive material, such as insulated metal wires.

One of the primary purposes of the nonconductive portion 14 is to insulate the substrate 12 from the first conductor 16 and the second conductor 18. Thus, the nonconductive portion 14 does not necessary entirely encase the first conductor 16 and the second conductor 18, but may alternately be a relatively planar piece disposed between the substrate 12 and the first and second conductors 16 and 18. Another function of the nonconductive portion 14 is to provide electrical insulation between the first conductor 16 and the second conductor 18, and between both the first conductor 16 and the second conductor 18 and the other portion 20 of the electrostatic chuck 10.

However, these functions can be performed by elements other than the nonconductive portion 14.

Figure 2:
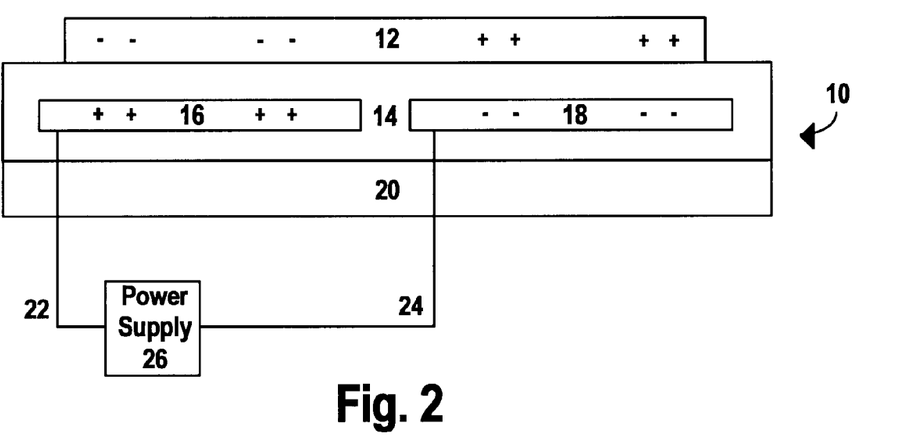
FIG. 2 is a cross sectional functional representation of the electrostatic chuck during energizing.

The electrostatic chuck 10 operates by energizing the power supply 26 to create a positive potential in one of the first conductor 16 and the second conductor 18 and a negative potential in the other of the first conductor 16 and the second conductor 18. For example, as depicted in FIG. 2, the power supply 26 is energized to create a positive potential in the first conductor 16 and a negative potential in the second conductor 18. By virtue of the non-electrically conductive properties of the nonconductive portion 14, the positive potential in the first conductor 16 and the negative potential in the second conductor 18 are not equalized by a flowing electrical current through the substrate 12.

Thus, the positive electrical potential in the first conductor 16 and the negative electrical potential in the second conductor 18 are not dissipated, but remain within the first conductor 16 and the second conductor 18 to exert an influence on the substrate 12.

The influence exerted on the substrate 12 tends to induce regional electrical charges within the substrate 12. As depicted, the positive electrical potential in the first conductor 16 tends to induce a regional negative electrical charge within that portion of the substrate 12 that overlies the positively charged first conductor 16. This is accomplished because the positively charged first conductor tends to attract the opposite electrical charges, being the negative electrical charges, that are already within the substrate 12. Similarly the negative electrical potential in the second conductor 18 tends to induce a regional positive electrical charge within that portion of the substrate 12 that overlies the negatively charged second conductor 18. This is accomplished because the negatively charged second conductor tends to attract the opposite electrical charges,being the positive electrical charges, that are already within the substrate 12.

The electrostatic attraction between the regional negative electrical charges and the positively charged first conductor 16, combined with the electrostatic attraction between the regional positive electrical charges and the negatively charge second conductor 18, tend to produce a force by which the substrate 12 is retained against the electrostatic chuck 10. In this manner, energizing the power supply 26 produces gripping signals that enable the retention of the substrate 12 against the electrostatic chuck 10, and de-energizing the power supply 26 enables the release of the substrate 12 from the electrostatic chuck 10, which can be considered to be a release signal.

As depicted in the various figures herein, such as in FIG. 2, the electrostatic chuck 10 is depicted as having two electrodes, being a first conductor 16 and a second conductor 18. It is appreciated that this specific configuration is exemplary only, and is used for the sake of simplicity of the figures and ease in description of the operation of the electrostatic chuck 10. In actual construction, the electrostatic chuck 10 may have several positively charged electrodes, such as the first conductor 16, and several negatively charged electrodes, such as the second conductor 18. These various positive and negative electrodes may be disposed around the surface of the electrostatic chuck 10 according to one or more of a variety of different patterns. For example, the positive and negative electrodes may be interleaved, with positive electrodes disposed between each of the negative electrodes. Further, the positive and negative electrodes may be disposed in a checkerboard pattern of the positive and negative electrodes.

In addition, the sizes of the electrodes, relative to the size of the electrostatic chuck 10 or the substrate 12, may not be the same as that depicted in the figures. For example, the positive and negative electrodes may be relatively narrow in comparison to the width of the electrostatic chuck 10. Alternately, one set of the electrodes, for example the positive electrodes, may be relatively narrow, and the other set of electrodes, for example the negative electrodes, may be relatively wide. In further embodiments, various ones of either or both sets of the positive and negative electrodes may be relatively narrow, while others of either or both sets of the positive and negative electrodes may be relatively wide.

It is noted that, at the point to which an explanation of the system has currently been made, the substrate 12 tends to have a substantial balance between the amount of negative charges regionally disposed in the portion of the substrate 12 that overlies the first conductor 16 and the amount of positive charges regionally disposed in the portion of the substrate 12 that overlies the second conductor 18. Thus, if the power supply 26 is de-energized at this point, the regional positive charge and the regional negative charge would both tend to dissipate, as the charges recombined and equalized throughout the substrate 12. Thus, as the regional positive and negative charges dissipated, the electrostatic forces by which the substrate 12 is held to the electrostatic chuck 10 are also dissipated, and the substrate 12 is freely removed from the electrostatic chuck 10.

Figure 3:
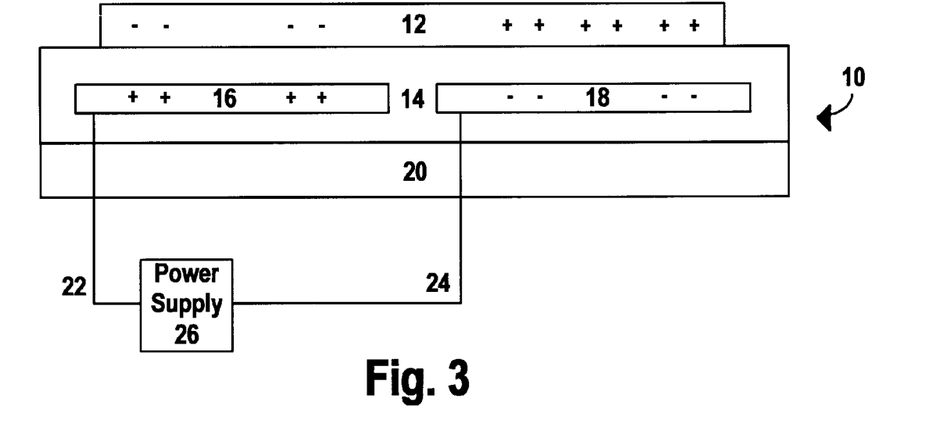
FIG. 3 is a cross sectional view of the electrostatic chuck during energizing, showing charge accumulation in the substrate on the electrostatic chuck.

Unfortunately, at some point in time while the substrate 12 is retained by the electrostatic chuck 10, additional residual charges may accumulate within the substrate 12. As depicted in FIG. 3, additional positive residual charges have accumulated within the substrate 12 in the regional positive charge that overlies the relatively negatively charged conductor 18. It is appreciated that this depiction is exemplary only, and that during actual conditions, both positive and negative residual charges may accumulate in the substrate 12, resulting in either a net positive residual charge accumulation or a net negative residual charge accumulation, which net accumulation tends to migrate to the region of the substrate 12 that overlies the oppositely charged first conductor 16 or second conductor 18, as the case may be.

Figure 4:
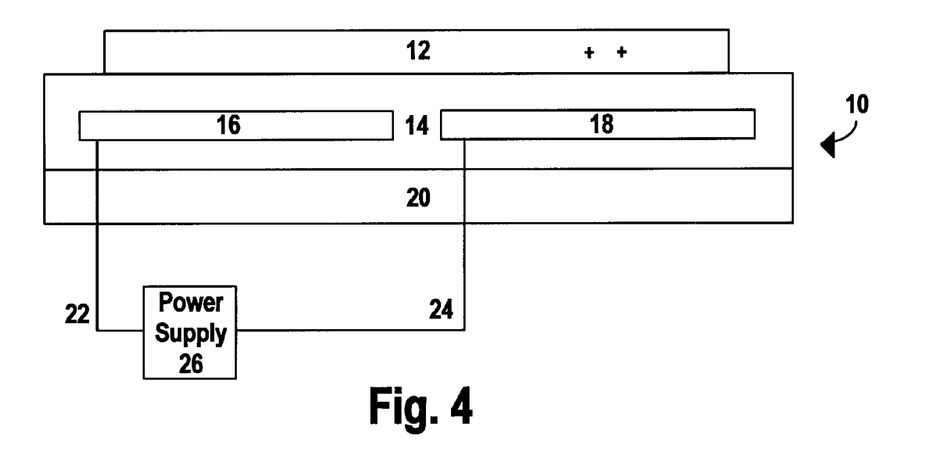
FIG. 4 is a cross sectional functional representation of an electrostatic chuck after energizing, showing charge accumulation in the substrate on the electrostatic chuck.

The residual charge that tends to accumulate in the substrate 12 may derive from one or more of a variety of sources. For example, if the substrate 12 is subjected to a plasma environment during processing, then the bombardment of primarily positive ions may create a net positive residual charge accumulation within the substrate 12. Similarly the bombardment of primarily negative ions may create a net negative residual charge accumulation within the substrate 12. Thus, after the electrostatic chuck 10 is de-energized, the substrate 10 has a net charge, such as the net positive residual charge as depicted in FIG. 4. This net residual charge accumulation with the substrate 12 may be attracted to an induced or otherwise preexisting charge within the electrostatic chuck 10.

As yet another example, extended use of the electrostatic chuck 12 over time or other factors may tend to degrade the electrically nonconductive properties of the nonconductive portion 14 of the electrostatic chuck 10 in the region between the first conductor 16 and the substrate 12 and the region between the second conductor 18 and the substrate 12. This may result in a general reduction in the dielectric strength of the nonconductive portion 14, or may for other reasons result in a charge that lingers in the nonconductive portion 14 after the power supply 26 is de-energized. These lingering charges tend to also induce regions of lingering charges within the substrate 12, as depicted in FIG. 4.

For whatever reason they may be created, such as those postulated above, and without being bound by any particular theory, the attraction of residual charges between the substrate 12 and the electrostatic chuck 10 tends to result in a lingering attraction between the substrate 12 and the electrostatic chuck 10, and a resultant retention of the substrate 12 against the electrostatic chuck 10. Thus, when a mechanical means is employed to physically remove the substrate 12 from the electrostatic chuck 10, the mechanical removal means must overcome the lingering attraction between the substrate 12 and the electrostatic chuck 10. In overcoming the lingering attraction between the substrate 12 and the electrostatic chuck 10, the mechanical removal means may generate sufficient force as to dislodge the substrate 12 from the position where it is expected to be, had it been smoothly released from the electrostatic chuck 10. Dislodging the substrate 12 from its intended position may create any number of different problems with the proper operation of the processing system in question.

Particularly in the example of plasma processing systems in which there is no grounded electrode, residual charge accumulation in the substrate 10 is relatively difficult to neutralize. For example, this condition tends to be a problem in the 4520XL etch system manufactured by Lam Research Corporation of Fremont, Calif. This condition is most prevalent in bipolar electrostatic chucks. Traditional methods of balancing charges in such a floating system tend to be somewhat ineffectual, because they do not take into account the charge that has been accumulated within the substrate 12. Thus, they may balance the system as a whole, but do not remove the accumulated charge from the substrate 12, and thus do not address the problem of difficulty in removing the charged substrate 12 from the electrostatic chuck 10.

Figure 5:
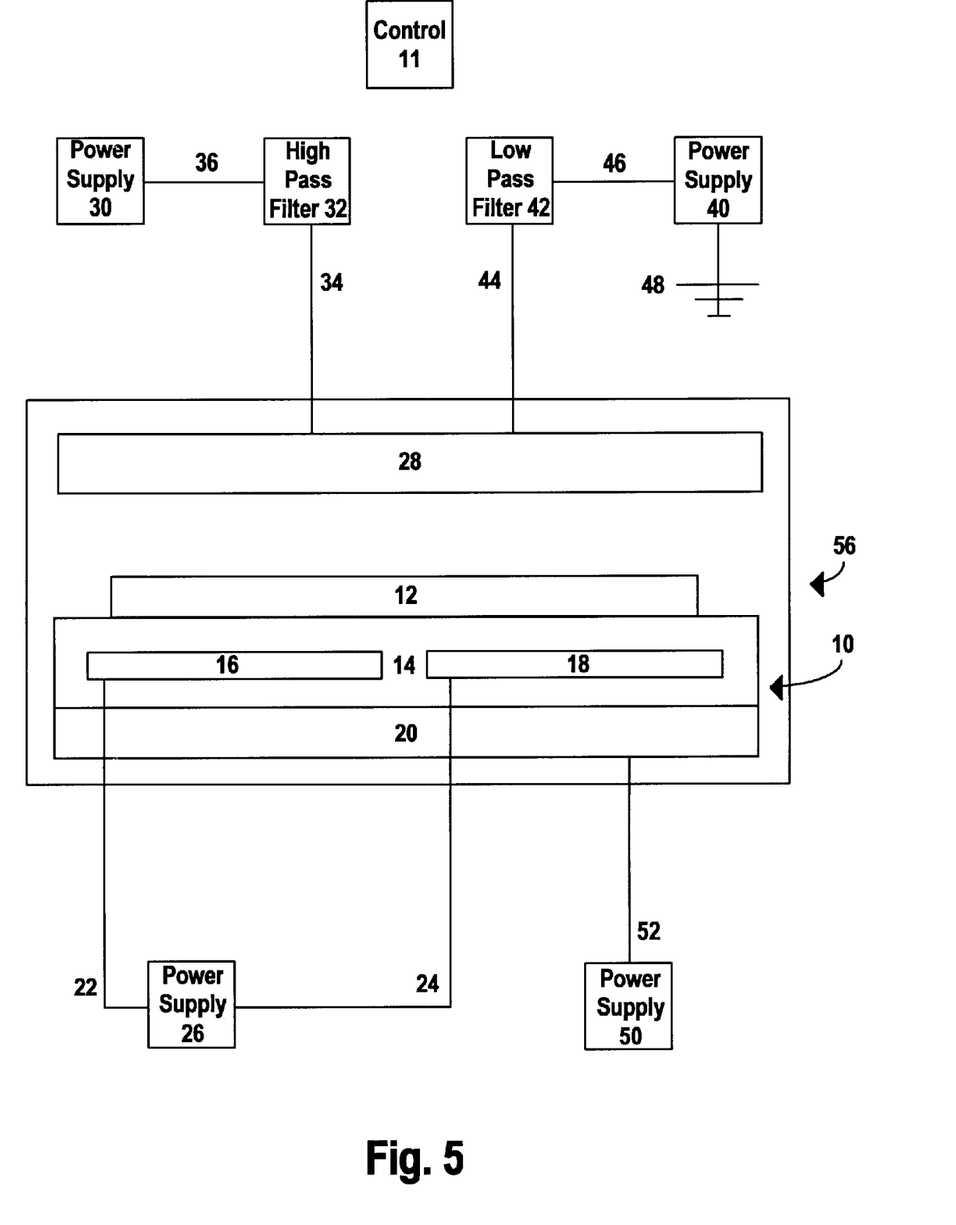
FIG. 5 is a functional representation of a first embodiment of a processing system according to the present invention.

A first embodiment of a modified processing system that addresses this problem is depicted in FIG. 5. In the embodiment of FIG. 5, the electrostatic chuck 10 is disposed within a process chamber 56. A first electrode 28 is also disposed within the process chamber 56. The process chamber 56 further defines within it an environment, in which it is desired to form a plasma for processing of the substrate 12. The environment is defined in a number of different ways, such as introducing different gases at different flow rates, temperatures, and pressures, while energized at different powers, all of which are specifically selected to achieve specific results.

In the embodiment of FIG. 5, the first electrode 28 is powered by a first radio frequency power supply, that produces a first radio frequency potential signal, and provides the first radio frequency potential signal on a first conductive path 36. The construction of the first conductive path 36, as with the construction of all of the other conductive paths as described herein, is selected so as to be compatible with the specific configuration of elements to which it is connected, and the function to which it is to be put. For example, the first conductive path 36 may be an insulated braided copper cable.

The first conductive path 36 is connected to a high pass filter 32, which allows the first radio frequency potential signal to pass through in a relatively unimpeded manner. However, the high pass filter 32 substantially inhibits conduction of lower frequency signals back to the first radio frequency power supply 30 along the first conductive path 36. In this manner, the high pass filter 32 protects the first radio frequency power supply 30 from damage by low frequency signals, such as those that are produced as described below. In a preferred embodiment, the high pass filter 32 inhibits signals lower than a first frequency, which is preferably between about 100 kilohertz and about 1.4 gigahertz, and which is most preferably between about 25% to about 50% of the primary frequency of the radio frequency power supply. The first radio frequency potential signal is passed from the high pass filter 32 to a second conductive path 34 to the first electrode 28.

In a similar manner, a second radio frequency power supply 50 generates a second radio frequency potential signal and passes it to a fifth conductive path 52 to a second electrode within the processing chamber 56. As depicted in FIG. 5, the second electrode is a conductive portion 20 of the electrostatic chuck 10. In alternate embodiments, some of which are explained at greater length below, the first radio frequency power supply 30 and the second radio frequency power supply 50 are the same radio frequency power supply. The first radio frequency potential signal is emitted into the environment within the processing chamber 56 by the first electrode 28, and the second radio frequency potential signal is emitted into the environment within the processing chamber 56 by the second electrode 20, and form a plasma of the environment within the processing chamber 56.

In operation, the substrate 12 is introduced to the processing chamber 56, and the power supply 26 is energized to send gripping signals to the electrostatic chuck 10 to selectively retain the substrate 12. The first electrode 28 and the second electrode 20 are energized and create a plasma within the processing chamber 56, thus processing the substrate 12 in the manner desired. However, during the processing of the substrate 12, a residual charge accumulates within the substrate 12. At the completion of processing, the first electrode 28 and the second electrode 20 can be energized in a manner designed to balance the charges of the elements within the processing system, but because the first electrode 28 and the second electrode 20 are floating, there is difficulty in fully removing the residual charge accumulation from the substrate 12.

Thus, a direct current power supply 40 is provided to aid in removing the residual charge in a manner as described below. The direct current power supply 40 is grounded, and is thus able to produce an absolute direct current potential signal. By "absolute" it is meant that the potential of the absolute direct current potential signal is known relative to the ground 48 to which the direct current power supply 40 is connected. The absolute direct current potential signal is passed by the direct current power supply 40 a third conduction path 46, that passes the absolute direct current potential signal to a low pass filter 42.

The low pass filter 42 allows the absolute direct current potential signal to pass through in a relatively unimpeded manner. However, the low pass filter 42 substantially inhibits conduction of high frequency signals back to the direct current power supply 40 along the third conductive path 46. In this manner, the low pass filter 42 protects the direct current power supply 40 from damage by high frequency signals, such as those that are produced by the first radio frequency power supply 30. In a preferred embodiment, the low pass filter 42 inhibits signals higher than a second frequency, which is preferably between about sixty hertz and about 1.4 gigahertz, and most preferably lower than the primary frequency of the radio frequency power supply. The absolute direct current potential signal is passed from the low pass filter 42 through a fourth conductive path 44 to the first electrode 28.

By applying the absolute direct current potential signal to the first electrode 28, a reference is provided to the first electrode 28, wherein the potential on the substrate 12, created by the residual charge accumulation in the substrate 12, can be more fully dissipated. In other words, the direct current bias provided by the absolute direct current potential signal on the first electrode 28, is adjustable to a level at which the residual charge accumulation on the substrate 12 is reduced to substantially a ground or zero potential. In this manner, there is no lingering attraction between the substrate 12 and the electrostatic chuck 10 after the power supply 26 is de-energized.

In a preferred embodiment, the direct current power supply 40 provides an absolute direct current potential signal having a voltage of between about zero volts and about 500 volts. The direct current potential signal applied by the direct current power supply 40 may be either a positive or negative potential relative to the ground 48. The selection of either a positive or a negative potential is made based on factors relating to the specific configuration of the plasma processing system, such as whether the first electrode 28 is acting as the anode or the cathode. In a most preferred embodiment, the potential of the direct current potential signal is no greater than about 200 volts, either positive or negative, and is selected so as to minimize the net residual accumulated charge.

Figure 6:
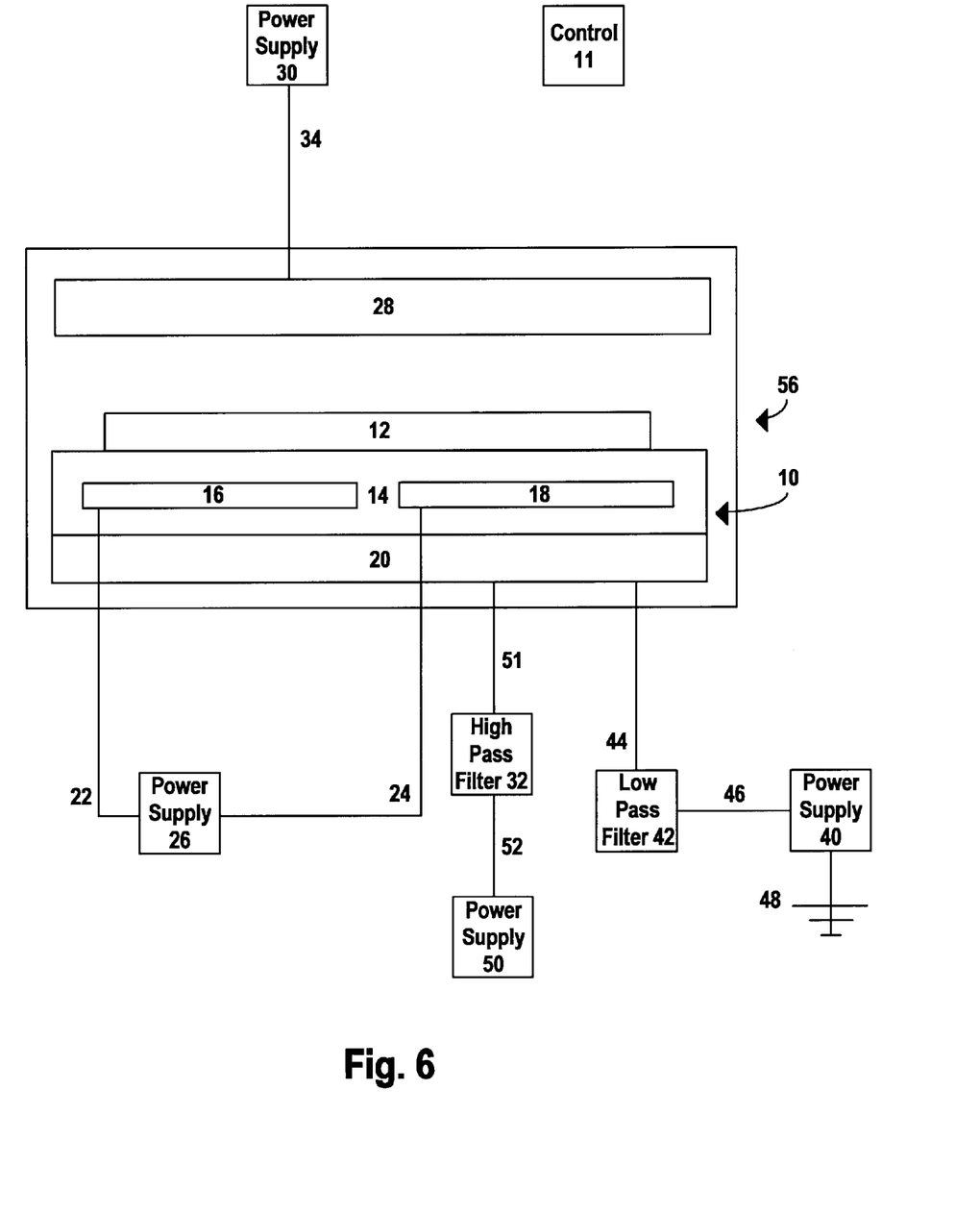
FIG. 6 is a functional representation of a second embodiment of a processing system according to the present invention.

FIG. 6 depicts another embodiment of the invention, in which the first radio frequency power supply 30 is directly connected via the second conductive path 34 to the first electrode 28, without first passing through an intermediate high pass filter. Rather, the high pass filter 32 is connected to the second radio frequency power supply 50 via the fifth conductive means 52, and then the high pass filter 32 is connected to the second electrode 20 via a sixth conductive path 51. The high pass filter 32 is so configured in this embodiment because the direct current power supply 40 is connected to the second electrode 20 in this embodiment, rather than to the first electrode 28. Thus, either electrode may function as the reference electrode to which the absolute direct current potential signal is applied.

Figure 7:
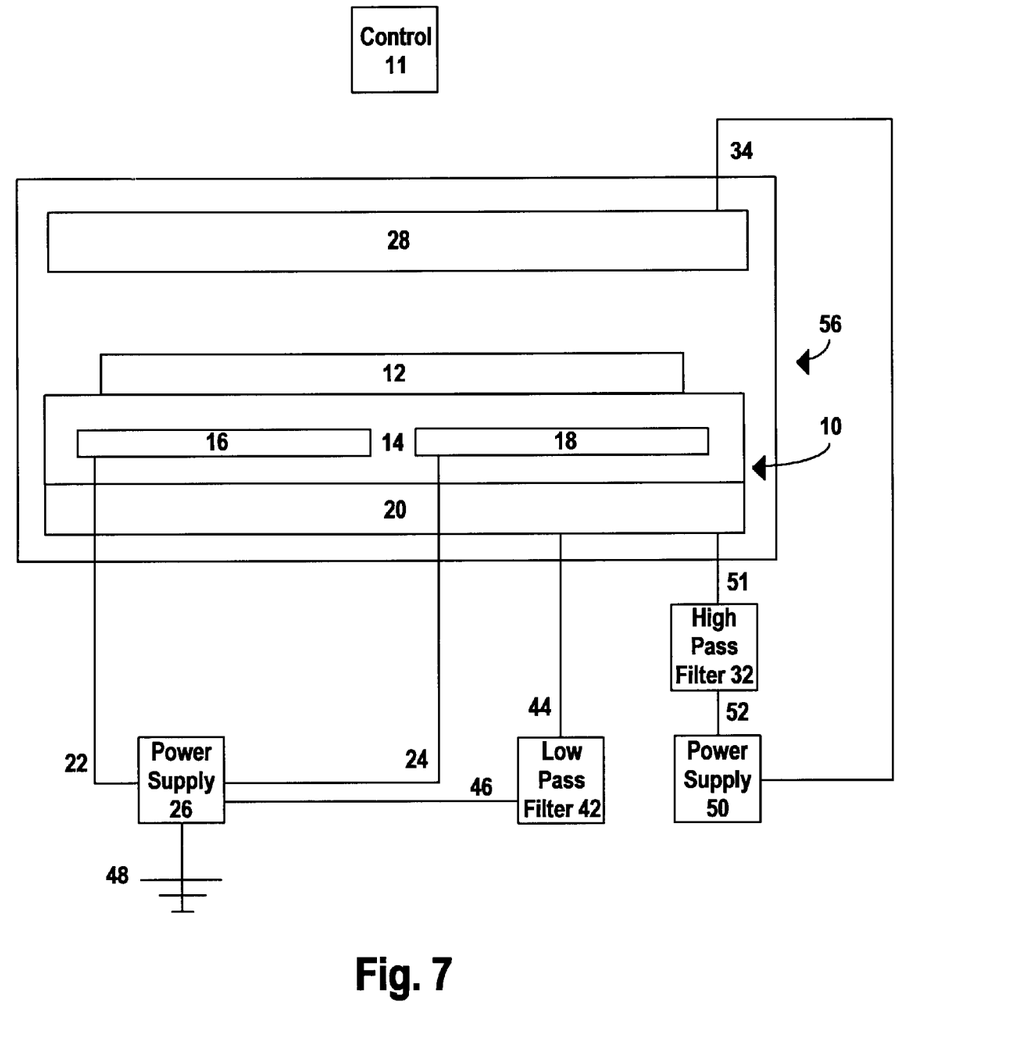
FIG. 7 is a functional representation of a third embodiment of a processing system according to the present invention.

FIG. 7 depicts yet another embodiment of the invention, in which a single radio frequency power supply 50 is employed to produce the first radio frequency potential signal and apply it to the first electrode 28 on the second conductive path 34, and also to produce the second radio frequency potential signal and apply it to the second electrode 20 through the fifth conductive path 52, the low pass filter 32, and the sixth conductive path 51. In this embodiment, the absolute direct current potential signal is also applied to the second electrode 20, which is why the high pass filter 32 is disposed between the radio frequency power supply 50 and the second electrode 20. In this same general configuration with a single radio frequency power supply 50, the absolute direct current potential signal could be applied to the first electrode 28 instead, in which embodiment the high pass filter 32 and the low pass filter 42 would be functionally disposed between the first electrode 28 and the power supply 26 and the radio frequency power supply 50, respectively.

Also in the embodiment depicted in FIG. 7, the power supply 26 that is used to create the grip and release signals for the electrostatic chuck 10 is connected to the ground 48, and also is connected via the third conductive path 46 to the low pass filter 42, and thereby to the fourth conductive path 44 to the second electrode 20. Thus in this embodiment, a single power supply 26 is used to provide the grip and release signals to the electrostatic chuck 20, and also to provide the absolute direct current potential signal to the second electrode 20. In this embodiment, the power supply 26 is preferably operable to separately and independently selectively energize and de-energize conductive paths 22 and 24 together, and the third conductive path 46. In this manner, the power supply 26 can send the absolute direct current potential signal independently of the grip and release signals.

As mentioned above, the fourth conductive path 44 could alternately be connected to the first electrode 28 rather than to the second electrode 20. In this alternate embodiment, the high pass filter 32 would then be functionally disposed between the radio frequency power supply 50 and the first electrode 28, rather than between the radio frequency power supply 50 and the second electrode 20, as depicted.

The direct current power supplies 26 and 40 and the radio frequency power supplies 30 and 50 are all preferably under the control of a controller 11, such as a programmable controller. In a most preferred embodiment, the functions of other elements of the processing system, which have not been discussed at length herein, are also under the control of the controller 11. Control lines from the controller 11 to the various elements of the processing system that are under its control have not been drawn in the figures, as such connections are easily understood by those in the art, and would not add to the understanding of the invention. However, it is appreciated that connections of some type are employed between the controller 11 and the elements under its control.

The controller 11 is preferably used to energize the appropriate direct current power supply 26 or 40 at the appropriate time to apply the absolute direct current potential signal as desired to facilitate the release of the substrate 12 from the electrostatic chuck 10. For example, in a first embodiment, the controller 11 automatically energizes the direct current power supply 26 or 40 to apply the absolute direct current potential signal at either a fixed or a programmable voltage to the electrostatic chuck 10 when the first radio frequency potential signal is applied to the first electrode 28 and the second radio frequency potential signal is applied to the second electrode 20. In a second embodiment, the controller 11 automatically energizes the direct current power supply 26 or 40 to apply the absolute direct current potential signal at either a fixed or a programmable voltage to the electrostatic chuck 10 when the power supply 26 is deenergized as to the conductive paths 22 and 24 and the release signal is applied to the electrostatic chuck 10 to selectively release the substrate 12.

In a third embodiment, the controller 11 energizes the direct current power supply 26 or 40 to apply the absolute direct current potential signal at either a fixed or a programmable voltage to the electrostatic chuck 10 during at least one predetermined point in the processing of the substrate 12, other than those points described above. Of course, there are many other combinations of when and how the absolute direct current potential signal can be applied, which combination are within the scope of the present disclosure.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. In a plasma processing system, the improvement comprising:

a processing chamber for containing an environment and processing a substrate, an electrostatic chuck disposed within the processing chamber for receiving the substrate and for receiving grip and release signals, the electrostatic chuck operable in response to the grip and release signals to selectively grip the substrate and selectively release the substrate, a radio frequency power supply for creating and passing a first radio frequency potential signal, a first conduction path connected to the radio frequency power supply, the first conduction path for receiving the first radio frequency potential signal from the radio frequency power supply and passing the first radio frequency potential signal, a high pass filter connected to the first conduction path, the high pass filter for receiving the first radio frequency potential signal from the first conduction path, passing the first radio frequency potential signal, and inhibiting signals lower than a first frequency from passing to the radio frequency power supply through the first conduction path, a second conduction path connected to the high pass filter, the second conduction path for receiving the first radio frequency potential signal from the high pass filter and passing the first radio frequency potential signal, a first electrode disposed within the processing chamber and connected to the second conduction path, the first electrode for receiving the first radio frequency potential signal from the second conduction path and emitting the first radio frequency potential signal within the processing chamber, a second electrode disposed within the processing chamber, the second electrode for receiving a second radio frequency potential signal and emitting the second radio frequency potential signal within the processing chamber, the emission of the first radio frequency potential signal and the emission of the second radio frequency potential signal creating a plasma from the environment within the processing chamber and thereby processing the substrate, where processing the substrate tends to create a residual charge in the substrate, which residual charge tends to inhibit the selective release of the substrate from the electrostatic chuck, a direct current power supply connected to a ground, the direct current power supply for creating and passing an absolute direct current potential signal, a third conduction path connected to the direct current power supply, the third conduction path for receiving the absolute direct current potential signal from the direct current power supply and passing the absolute direct current potential signal, a low pass filter connected to the third conduction path, the low pass filter for receiving the absolute direct current potential signal from the third conduction path, passing the absolute direct current potential signal, and inhibiting signals higher than a second frequency from passing to the direct current power supply through the third conduction path, a fourth conduction path connected to the low pass filter, the fourth conduction path for receiving the absolute direct current potential signal from the low pass filter and passing the absolute direct current potential signal to the first electrode, the first electrode connected to the fourth conduction path, the first electrode for receiving the absolute direct current potential signal from the fourth conduction path and thereby receiving an absolute potential reference, and a controller for selectively enabling application of the first radio frequency potential signal to the first electrode and application of the second radio frequency potential signal to the second electrode, for selectively enabling application of the grip and release signals to the electrostatic chuck, and for selectively energizing the direct current power supply to apply the absolute direct current potential signal to the first electrode when reduction of the residual charge in the substrate is desired, and thereby for assisting in the desired release of the substrate from the electrostatic chuck.

2. The plasma processing system of claim 1, wherein the first frequency is between about 100 kilohertz and about 1.4 gigahertz.

3. The plasma processing system of claim 1, wherein the second frequency is between about sixty hertz and about 1.4 gigahertz.

4. The plasma processing system of claim 1, wherein the absolute direct current potential signal has a positive voltage of between about zero volts and about 500 volts.

5. The plasma processing system of claim 1, wherein the absolute direct current potential signal has a negative voltage of between about zero volts and about 500 volts.

6. The plasma processing system of claim 1, further comprising:

the radio frequency power supply for creating the second radio frequency potential signal, and passing the second radio frequency potential signal, a fifth conduction path connected to the radio frequency power supply, the fifth conduction path for receiving the second radio frequency potential signal from the radio frequency power supply and passing the second radio frequency potential signal to the second electrode.

7. The plasma processing system of claim 1, wherein the second conductive path and the fourth conductive path are a single common conductive path.

8. The plasma processing system of claim 1, wherein the electrostatic chuck is a part of the first electrode.

9. The plasma processing system of claim 1, wherein the electrostatic chuck is a part of the second electrode.

10. The plasma processing system of claim 1, further comprising:

the direct current power supply for creating and passing the grip and release signals, a sixth conduction path connected to the direct current power supply, the sixth conduction path for receiving the grip and release signals from the direct current power supply, and passing the grip and release signals to the electrostatic chuck.

11. The plasma processing system of claim 1, wherein the controller is operable to automatically energize the direct current power supply to apply the absolute direct current potential signal at a fixed voltage to the electrostatic chuck when the first radio frequency potential signal is applied to the first electrode and the second radio frequency potential signal is applied to the second electrode.

12. The plasma processing system of claim 1, wherein the controller is operable to automatically energize the direct current power supply to apply the absolute direct current potential signal at a fixed voltage to the electrostatic chuck when the grip and release signals are applied to the electrostatic chuck to selectively release the substrate.

13. The plasma processing system of claim 1, wherein the controller is operable to energize the direct current power supply to apply the absolute direct current potential signal at a fixed voltage to the electrostatic chuck during at least one predetermined point in the processing of the substrate.

14. The plasma processing system of claim 1, wherein the controller is operable to energize the direct current power supply to apply the absolute direct current potential signal at a programmable voltage to the electrostatic chuck during at least one predetermined point in the processing of the substrate.

15. The plasma processing system of claim 1, wherein the controller is operable to energize the direct current power supply to apply the absolute direct current potential signal to the electrostatic chuck at all times that the plasma processing system is energized.

16. A radio frequency plasma processing system having an electrostatic chuck for holding a substrate, a processing chamber, and a radio frequency power supply connected by a first conduction path to an electrode disposed within the processing chamber, the plasma processing system modified to aid in discharging accumulated charges in the substrate, and thereby aiding in releasing the substrate from the electrostatic chuck, the improvement comprising:

a direct current power supply connected to a ground, the direct current power supply for creating and passing an absolute direct current potential signal, a second conduction path connected to the direct current power supply, the second conduction path for receiving the absolute direct current potential signal from the direct current power supply and passing the absolute direct current potential signal, a low pass filter connected to the second conduction path, the low pass filter for receiving the absolute direct current potential signal from the second conduction path, passing the absolute direct current potential signal, and inhibiting signals higher than a second frequency from passing to the direct current power supply through the second conduction path, a third conduction path connected to the low pass filter, the third conduction path for receiving the absolute direct current potential signal from the low pass filter and passing the absolute direct current potential signal to the electrode, and a high pass filter disposed within the first conduction path between the radio frequency power supply and the electrode, the high pass filter for inhibiting signals lower than a first frequency from passing to the radio frequency power supply through the first conduction path.

17. The plasma processing system of claim 16, wherein the first frequency is between about 100 kilohertz and about 1.4 gigahertz.

18. The plasma processing system of claim 16, wherein the second frequency is between about sixty hertz and about 1.4 gigahertz.

19. A method for reducing charges accumulated on a substrate residing on an electrostatic chuck in a processing chamber of a plasma processing system that has a radio frequency power supply connected by a first conduction path to a first electrode disposed within the processing chamber, and a second electrode, the method comprising the steps of:

energizing the first and second electrodes to create a discharge plasma within the processing chamber, high pass filtering the first conduction path to inhibit signals lower than a first frequency from passing to the radio frequency power supply from the first electrode, applying an absolute direct current potential signal to the first electrode through a second conduction path with a direct current power supply to provide a reference to the first electrode and thereby enable reduction of the accumulated charges on the substrate, and low pass filtering the second conduction path to inhibit signals higher than a first frequency from passing to the direct current power supply from the first electrode.

20. The method of claim 19, wherein the first frequency is between about 100 kilohertz and about 1.4 gigahertz, and the second frequency is between about sixty hertz and about 1.4 gigahertz.

* * * * *